United States Patent
Kamisuwa et al.

(10) Patent No.: US 7,774,169 B2
(45) Date of Patent: Aug. 10, 2010

(54) MAINTENANCE SYSTEM AND METHOD

(75) Inventors: Yoshikatsu Kamisuwa, Shinagawa-ku (JP); Rintaro Nakane, Yokohama (JP)

(73) Assignees: Toshiba Tec Kabushiki Kaisha, Tokyo (JP); Kabushiki Kaisha Toshiba, Tokyo (JP)

( * ) Notice: Subject to any disclaimer, the term of this patent is extended or adjusted under 35 U.S.C. 154(b) by 1077 days.

(21) Appl. No.: 11/427,770

(22) Filed: Jun. 29, 2006

(65) Prior Publication Data
US 2008/0002995 A1 Jan. 3, 2008

(51) Int. Cl.
*G06F 11/30* (2006.01)
*G21C 17/00* (2006.01)

(52) U.S. Cl. ...................................... 702/184
(58) Field of Classification Search ............ 702/81, 702/83, 84, 179–181, 183–185; 700/108–110; 705/8, 9, 400; 714/5, 47, 48
See application file for complete search history.

(56) References Cited

U.S. PATENT DOCUMENTS

| | | | | |
|---|---|---|---|---|
| 5,216,464 | A * | 6/1993 | Kotani et al. ................ | 399/24 |
| 6,532,426 | B1 * | 3/2003 | Hooks et al. ................ | 702/81 |
| 6,738,748 | B2 * | 5/2004 | Wetzer ......................... | 705/9 |
| 7,082,384 | B2 * | 7/2006 | Sasaki et al. ............... | 702/184 |
| 7,467,841 | B2 * | 12/2008 | Kamisuwa et al. ......... | 347/19 |
| 7,474,988 | B2 * | 1/2009 | Kamisuwa et al. ......... | 702/184 |
| 2003/0158772 | A1 * | 8/2003 | Harris ........................ | 705/10 |
| 2004/0071161 | A1 * | 4/2004 | Tahara et al. ............... | 370/465 |
| 2004/0136025 | A1 * | 7/2004 | Moriyama et al. .......... | 358/1.14 |
| 2005/0015283 | A1 * | 1/2005 | Iino et al. .................... | 705/4 |
| 2005/0080596 | A1 * | 4/2005 | Duckert et al. ............. | 702/184 |
| 2005/0286742 | A1 * | 12/2005 | Rasmussen et al. ........ | 382/112 |
| 2008/0002995 | A1 * | 1/2008 | Kamisuwa et al. ......... | 399/8 |
| 2008/0062211 | A1 * | 3/2008 | Kamisuwa et al. ......... | 347/5 |
| 2009/0041478 | A1 * | 2/2009 | Kamisuwa et al. ......... | 399/8 |
| 2009/0132321 | A1 * | 5/2009 | Kamisuwa et al. ......... | 705/8 |
| 2009/0210278 | A1 * | 8/2009 | Kamisuwa et al. ......... | 705/8 |

FOREIGN PATENT DOCUMENTS

| | | | |
|---|---|---|---|
| JP | 07-056620 | * | 3/1995 |
| JP | 2004-152017 | | 5/2004 |
| JP | 2006-139272 | * | 6/2006 |

OTHER PUBLICATIONS

English Abstract of JP 2006-139272, Jun. 1, 2006.*
English Abstract of JP 07-056620, Mar. 1995.*

* cited by examiner

*Primary Examiner*—Michael P Nghiem
(74) *Attorney, Agent, or Firm*—Patterson & Sheridan, LLP

(57) ABSTRACT

A maintenance system for an apparatus that is a maintenance target enables reduction in cost related to maintenance services and reduction in downtime of the apparatus. The maintenance system acquires information related to a visit interval that prescribes a time interval at which a visit should be made for maintenance operation for each consumable part and a replacement interval that prescribes a time interval at which each consumable part should be replaced, acquires a counter value that indicates actual use of the consumable parts, and calculates the time for the next maintenance visit and the consumable part that should be replaced at that time, on the basis of the information related to the visit interval and the replacement interval, and the counter value.

20 Claims, 13 Drawing Sheets

| ID | MACHINE.ID | MACHINE TYPE.NAME | CONSUMABLE PART.ABBREVIATION | VISIT DATE | COUNTER | FAILURE INTERVAL | END OF LIFE |
|---|---|---|---|---|---|---|---|
| 020901005 | 100213 | MACHINE TYPE A | SETUP | 2002/9/1 | 0 | 0 | — |
| 030128001 | 100213 | MACHINE TYPE A | NO PROBLEM | 2003/1/28 | 515907 | — | — |
| 030407010 | 100213 | MACHINE TYPE A | PHOTOCONDUCTIVE DRUM | 2003/4/7 | 746343 | 241052 | × |
| 030421001 | 100213 | MACHINE TYPE A | PHOTOCONDUCTIVE DRUM | 2003/4/21 | 786417 | 40074 | × |
| 021115001 | 102399 | MACHINE TYPE A | PHOTOCONDUCTIVE DRUM | 2002/11/15 | 52354 | 33466 | × |
| 021120002 | 102399 | MACHINE TYPE A | PHOTOCONDUCTIVE DRUM | 2002/11/20 | 53366 | 1012 | × |
| 021122001 | 102399 | MACHINE TYPE A | PHOTOCONDUCTIVE DRUM | 2002/11/22 | 54450 | 1084 | × |
| 030523008 | 102399 | MACHINE TYPE A | PM ALL-REPLACEMENT | 2003/5/23 | 570954 | 516504 | ○ |
| 030529011 | 102399 | MACHINE TYPE A | NOT REPRODUCED | 2003/5/27 | 572918 | — | — |
| 030529004 | 102399 | MACHINE TYPE A | CHARGER WIRE | 2003/5/29 | 578500 | 7546 | — |
| 031217001 | 102400 | MACHINE TYPE A | PM ALL-REPLACEMENT | 2003/12/17 | 1211848 | 136328 | ○ |
| 031218003 | 102400 | MACHINE TYPE A | FIXING ROLLER 1 | 2003/12/18 | 1211898 | 50 | — |
| 030507006 | 112240 | MACHINE TYPE A | PHOTOCONDUCTIVE DRUM | 2003/5/7 | 1108467 | 12356 | × |
| 030714003 | 139855 | MACHINE TYPE B | PM ALL-REPLACEMENT | 2003/7/14 | 1465441 | 305552 | — |
| 030723003 | 139855 | MACHINE TYPE B | STAIN ON MANUSCRIPT TABLE GLASS | 2003/7/23 | 1465490 | 49 | — |

FIG. 4

| | MACHINE TYPE. NAME | ABBREVIATION | | FAILURE DISTRIBUTION CLASSIFICATION | FAILURE DISTRIBUTION PARAMETER 1 | FAILURE DISTRIBUTION PARAMETER 2 | FAILURE DISTRIBUTION PARAMETER 3 |
|---|---|---|---|---|---|---|---|
| | MACHINE TYPE A | PHOTOCONDUCTIVE DRUM | | 0 | 3.2 | 623K | - |
| | MACHINE TYPE A | FEED ROLLER | | 0 | 5.1 | 500K | - |
| | MACHINE TYPE A | TRANSFER BELT | | 0 | 1.2 | 821K | - |
| | ~ | | | | | | |
| | MACHINE TYPE B | PHOTOCONDUCTIVE DRUM | | 0 | 1.5 | 790K | - |
| | MACHINE TYPE B | FEED ROLLER | | 0 | 5.3 | 520K | - |
| | ~ | | | | | | |

| ID | | COUNTER PROCEEDING AVERAGE | COUNTER PROCEEDING DISTRIBUTION | COUNTER ACQUISITION DATE | TOTAL COUNTER | |
|---|---|---|---|---|---|---|
| 100213 | | 2634 | 1815 | 2004/1/28 | 1027012 | |
| 102399 | | 4565 | 3212 | 2004/1/13 | 1279732 | |
| 102400 | | 6012 | 3604 | 2004/1/28 | 2697196 | |
| | | | | ~ | | |

| MACHINE. ID | CONSUMABLE PART. ABBREVIATION | COUNTER ACQUISITION DATE | COUNTER | |
|---|---|---|---|---|
| 102399 | PHOTOCONDUCTIVE DRUM | 2003/5/23 | 0 | |
| 102399 | CHARGER WIRE | 2003/5/29 | 0 | |
| 102399 | TRANSFER BELT | 2003/5/23 | 0 | |
| | ~ | | | |
| 112400 | PHOTOCONDUCTIVE DRUM | 2003/5/7 | 0 | |
| 112400 | CHARGER WIRE | 2003/3/25 | 0 | |
| | ~ | | | |

FIG. 7

SAMPLE 1

| MACHINE.ID | ABBREVIATION | VISIT INTERVAL | FAILURE INTERVAL |
|---|---|---|---|
| 100213 | PHOTOCONDUCTIVE DRUM | 600K | 540K |
| 100213 | FEED ROLLER | 480K | 430K |
| | ... | | |
| 100213 | TRANSFER BELT | 750K | 670K |

SAMPLE 2

| MACHINE.ID | ABBREVIATION | VISIT INTERVAL | FAILURE INTERVAL |
|---|---|---|---|
| 100213 | PHOTOCONDUCTIVE DRUM | 550K | 530K |
| 100213 | FEED ROLLER | 500K | 450K |
| | ... | | |
| 100213 | TRANSFER BELT | 800K | 740K |

SAMPLE 3

| MACHINE.ID | ABBREVIATION | VISIT INTERVAL | FAILURE INTERVAL |
|---|---|---|---|
| 100213 | PHOTOCONDUCTIVE DRUM | 450K | 450K |
| 100213 | FEED ROLLER | 460K | 400K |
| | ... | | |
| 100213 | TRANSFER BELT | 770K | 740K |

...

SAMPLE 2000

| MACHINE.ID | ABBREVIATION | VISIT INTERVAL | FAILURE INTERVAL |
|---|---|---|---|
| 100213 | PHOTOCONDUCTIVE DRUM | 580K | 550K |
| 100213 | FEED ROLLER | 460K | 440K |
| | ... | | |
| 100213 | TRANSFER BELT | 850K | 830K |

FIG. 9

| STRATEGY NUMBER | COST |
|---:|---:|
| 1 | 0.658 |
| 2 | 0.667 |
| 3 | 0.701 |
| 4 | 0.558 |
| 5 | 0.667 |
| ... | ... |
| 112 | 0.489 |
| ... | ... |
| 2000 | 0.600 |

| MACHINE. ID | COUNTER ACQUISITION DATE | TOTAL COUNTER |
|---|---|---|
| 100213 | 2004/1/26 | 1025392 |
| 100213 | 2004/1/27 | 1025401 |
| 100213 | 2004/1/28 | 1027012 |
| ～ | | |
| 102399 | 2004/1/12 | 1276511 |
| 102399 | 2004/1/13 | 1279732 |
| ～ | | |
| 102400 | 2004/1/28 | 2697196 |
| ～ | | |

FIG. 12

```
TUESDAY, JANUARY 24, 2006

MACHINE SERIAL NUMBER : 100213

--- OPTIMUM MAINTENANCE PLAN CALCULATION RESULT ---

NEXT VISIT DATE:     THURSDAY, FEBRUARY 23, 2006

PARTS TO BE REPLACED: PHOTOCONDUCTIVE DRUM, FIXING ROLLER 1,
                     FIXING ROLLER 2
```

MAINTENANCE SYSTEM AND METHOD

BACKGROUND OF THE INVENTION

1. Field of the Invention

This invention relates to a technique of estimating the time of failure of a product including plural components and the degree of degradation of each component, and reflecting these to a maintenance plan.

2. Description of the Related Art

Conventional maintenance planning depends on the experience and intuition of individual servicemen. Therefore, the risk of damage to a user caused by the unavailability of a product and the maintenance cost cannot be balanced with each other.

That is, in order to reduce the risk of product failure, a replacement operation takes place more than necessary so as to replace a component in which failure is very likely to occur, before its service life end, and the maintenance cost increases. Conversely, to lower the maintenance cost by using up the component to the end of its service life, a visit is made after failure occurs. Therefore, it is a trade-off with a longer downtime and increased damage to the user caused by the unavailability of the product.

In another type of industry, there is an example of maintenance planning based on the cost and risk (see, JP-A-2004-152017). However, this is limited to a judgment on whether to conduct maintenance or not, based on the risk, and it is difficult to estimate the cost if the number of components to be replaced (consumable parts) increases. That is, when judging whether to replace consumable parts or not, a very high calculation cost is required for calculating which combination of consumable parts should be replaced as the best maintenance plan. Also, it cannot be seen how long the time for next visit can be prolonged, and the cost cannot be calculated simply.

SUMMARY OF THE INVENTION

This invention is made in order to solve the foregoing problems, and it is an object of this invention to provide a technique that enables reduction in the cost of maintenance services and reduction in the downtime of a product.

To solve the foregoing problem, a maintenance system according to this invention adapted for making a maintenance plan for consumable parts of an apparatus that is a maintenance target, includes: an interval information acquiring unit configured to acquire information related to a combination of a visit interval that prescribes a time interval at which a visit should be made for maintenance operation for each consumable part, and a replacement interval that prescribes a time interval at which each consumable part should be replaced and that is associated with the visit interval; a counter value acquiring unit configured to acquire a counter value that indicates actual use of consumable parts in the apparatus that is a maintenance target; and a maintenance plan calculating unit configured to calculate timing at which a next visit should be made for the apparatus that is a maintenance target, and a consumable part that should be replaced at the timing, on the basis of the information acquired by the interval information acquiring unit and the counter value acquired by the counter value acquiring unit.

To solve the foregoing problem, a maintenance system according to this invention adapted for making a maintenance plan for consumable parts of an apparatus that is a maintenance target, includes: interval information acquiring means for acquiring information related to a combination of a visit interval that prescribes a time interval at which a visit should be made for maintenance operation for each consumable part, and a replacement interval that prescribes a time interval at which each consumable parts should be replaced and that is associated with the visit interval; counter value acquiring means for acquiring a counter value that indicates actual use of consumable parts in the apparatus that is a maintenance target; and maintenance plan calculating means for calculating timing at which a next visit should be made for the apparatus that is a maintenance target, and a consumable part that should be replaced at the timing, on the basis of the information acquired by the interval information acquiring means and the counter value acquired by the counter value acquiring means.

To solve the foregoing problem, a maintenance method according to this invention adapted for making a maintenance plan for consumable parts of an apparatus that is a maintenance target, includes: an interval information acquiring step of acquiring information related to a combination of a visit interval that prescribes a time interval at which a visit should be made for maintenance operation for each consumable part, and a replacement interval that prescribes a time interval at which each consumable parts should be replaced and that is associated with the visit interval; a counter value acquiring step of acquiring a counter value that indicates actual use of consumable parts in the apparatus that is a maintenance target; and a maintenance plan calculating step of calculating timing at which a next visit should be made for the apparatus that is a maintenance target, and a consumable part that should be replaced at the timing, on the basis of the information acquired in the interval information acquiring step and the counter value acquired in the counter value acquiring step.

DESCRIPTION OF THE DRAWINGS

FIG. 3 is a view showing an exemplary maintenance history table 301 with its contents updated.

FIG. 4 is a view showing an exemplary consumable part table 302 in an updated state.

FIG. 5 is a view showing an exemplary machine table with its contents updated.

FIG. 6 is a view showing an example of data in a consumable part status table 304 with its contents updated.

FIG. 7 is a view showing samples of setting maintenance planning strategies (combinations of visit intervals and replacement intervals for each consumable part) with respect to a machine having "machine.ID" of 100213.

FIG. 9 is a view showing the result of simulation for each sample.

FIG. 11 is a view showing an exemplary "counter history" table.

FIG. 12 is a view showing exemplary notification contents in a notifying unit 208.

DESCRIPTION OF THE EMBODIMENTS

Hereinafter, an embodiment of this invention will be described with reference to the drawings.

Figure 1:
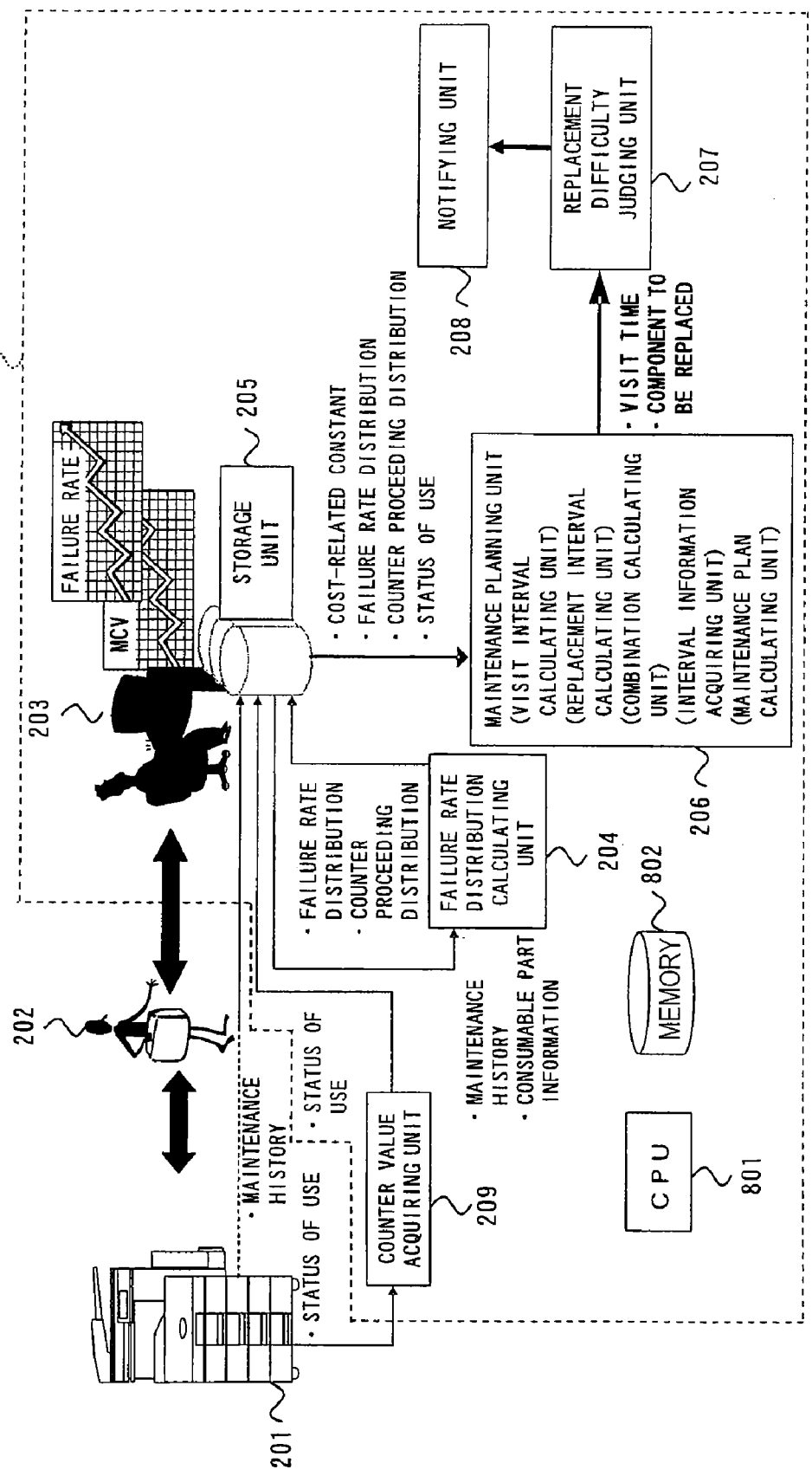
FIG. 1 is a view of a system configuration showing the outline of a maintenance system according to an embodiment of this invention.

FIG. 1 is a view of a system configuration showing the outline of a maintenance system according to an embodiment of this invention. FIG. 1 shows an example in which a maintenance plan for an image processing apparatus or multifunction peripheral (MFP) 201 installed at a user's location is made by the maintenance system according to this embodiment, and in which a serviceman 202 carries out maintenance services according to the maintenance plan.

In the conventional maintenance services, the serviceman 202 visits an MFP that is a maintenance target at every timing for PM (preventive maintenance) set for each MFP, and carries out replacement of consumable parts, cleaning, and confirmation of operations of the MFP. Other than PM, when failure accidentally occurs, the serviceman receives a service call from the user and makes a visit to repair the MFP.

As for the PM operation, since there are plural consumable parts in one MFP, if all the consumable parts are note degraded at the time of PM and the consumable parts that have not reached the end of their lives are replaced, it causes loss. Also, when accidental failure occurs, if only the consumable part that has failure is replaced at that time, the replacement time deviates from the PM cycle.

Thus, while basically following a preset PM cycle, the serviceman 202 adjusts the replacement time for each consumable part individually on the basis of experience and thus tries to reduce the loss. However, if reduction in the cost is attempted by indiscriminately delaying the replacement time and extending the time of using the consumable parts, the risk of failure of the consumable parts increases adversely and therefore the unavailability of the MFP causes damage to the user. Moreover, if the replacement time is changed individually for each consumable part, it may be considered that the number of visits increases, which conversely increases the maintenance cost.

Thus, the maintenance system 1 according to this embodiment is configured to calculate failure rate distribution for each consumable part on the basis of the past maintenance history data and to calculate the time for next visit and a list of consumable parts to be replaced at the time, on the basis of the calculated failure rate distribution.

The maintenance system 1 in this case is adapted for making a maintenance plan for consumable parts of an apparatus that is a maintenance target, and includes a failure rate distribution calculating unit 204, a storage unit 205, a maintenance planning unit (visit interval calculating unit, replacement interval calculating unit, combination calculating unit, interval information acquiring unit, maintenance plan calculating unit) 206, a replacement difficulty judging unit 207, a notifying unit 208, a counter value acquiring unit 209, a CPU 801, and a memory 802.

The failure rate distribution calculating unit 204 calculates failure rate distribution for each consumable part on the basis of maintenance history data as history information related to the maintenance operation that has been carried out to the apparatus that is the maintenance target. Here, the history information related to the maintenance operation that has been carried out to the apparatus that is the maintenance target is inputted, for example, by the serviceman 202 who has carried out the maintenance operation, and thereby stored in the storage unit 205 at a service center 203.

The maintenance planning unit (visit interval calculating unit) 206 randomly calculates, for each consumable part, a "visit interval" prescribing a time interval at which a visit should be made for maintenance operation for each consumable part, on the basis of the failure rate distribution of each consumable part calculated by the failure rate distribution calculating unit 204. The maintenance planning unit (replacement interval calculating unit) 206 also randomly calculates, for each consumable part, a "replacement interval" prescribing a time interval at which replacement of each consumable part should be carried out, on the basis of the failure rate distribution of each consumable part. The "consumable parts" here may include, for example, a photoconductor drum, charger wire, fixing roller, transfer belt and the like. In this embodiment, however, the "consumable parts" include a cartridge in which plural consumable parts having different functions from each other are integrally formed as a unit.

Now, the maintenance planning unit (visit interval calculating unit and replacement interval calculating unit) 206 calculates a value close to an interval with which it is predicted that the failure probability is equal to or higher than a predetermined probability, on the basis of the failure probability distribution of each consumable part. The visit interval calculated by the maintenance planning unit (visit interval calculating unit) 206 for each consumable part is set to be longer than the replacement interval calculated by the maintenance planning unit (replacement interval calculating unit) 206.

The maintenance planning unit (combination calculating unit) 206 performs search processing using the Monte Carlo method or genetic algorithm on the basis of the visit interval calculated by the maintenance planning unit (visit interval calculating unit) 206 and the replacement interval calculated by the maintenance planning unit (replacement interval calculating unit) 206, and thereby calculates a combination of a visit interval and a replacement interval that minimizes a predetermined cost, of combinations of time intervals at which a visit should be made for maintenance operation and consumable parts that should be replaced during the visit.

The "predetermined cost" described here is the sum of the labor costs required for the maintenance operation by the serviceman, the material costs of the consumable parts, and the amount of loss caused by the unavailability of the apparatus that is the maintenance target to the user.

The maintenance planning unit (interval information acquiring unit) 206 acquires information related to a combination of the "visit interval" and the "replacement interval" associated with the visit interval, which is the information calculated by the maintenance planning unit (combination calculating unit) 206.

The counter value acquiring unit 209 acquires a counter value indicating actual use of the consumable parts of the apparatus that is the maintenance target. The counter value in this case refers to an actual use value that is effective for grasping the degree of degradation of each consumable part mounted in the image processing apparatus 201, such as the number of sheets processed by the image processing apparatus 201, for example, the number of scanned pages of a manuscript, the number of printed sheets or the like. The counter value acquired by the counter value acquiring unit 209 is sent to the service center 203 and stores into the storage unit 205.

The maintenance planning unit (maintenance plan calculating unit) 206 calculates timing at which the next visit should be made for the apparatus that is the maintenance target and a list of consumable parts that should be replaced at the timing, on the basis of the information acquired by the maintenance planning unit (interval information acquiring unit) 206 and the counter value acquired by the counter value acquiring unit 209.

The replacement difficulty judging unit 207 judges whether the consumable parts that should be replaced, calculated by the maintenance planning unit (maintenance plan calculating unit) 206, are components that can only be replaced by the serviceman carrying out the maintenance operation for the apparatus (serviceman replacement units or SRU) or not.

The notifying unit 208 includes, for example, a liquid crystal display or the like. If it is judged by the replacement difficulty judging unit 207 that the consumable parts are components that can only be replaced by the serviceman, the notifying unit 208 issues a notification that a visit should be made for the apparatus that is the maintenance target in order to replace the components, in the form of screen display. The notification by the notifying unit 208 is not necessarily limited to the screen display and it may be issued, for example, in the form of audio notification, print processing and the like.

The CPU 801 is responsible for performing various types of processing in the maintenance system 1 and also responsible for realizing various functions by executing programs stored in the memory 802. The memory 802 includes, for example, a ROM, RAM or the like, and is responsible for storing various types of information and programs used in the maintenance system 1.

Figure 2:
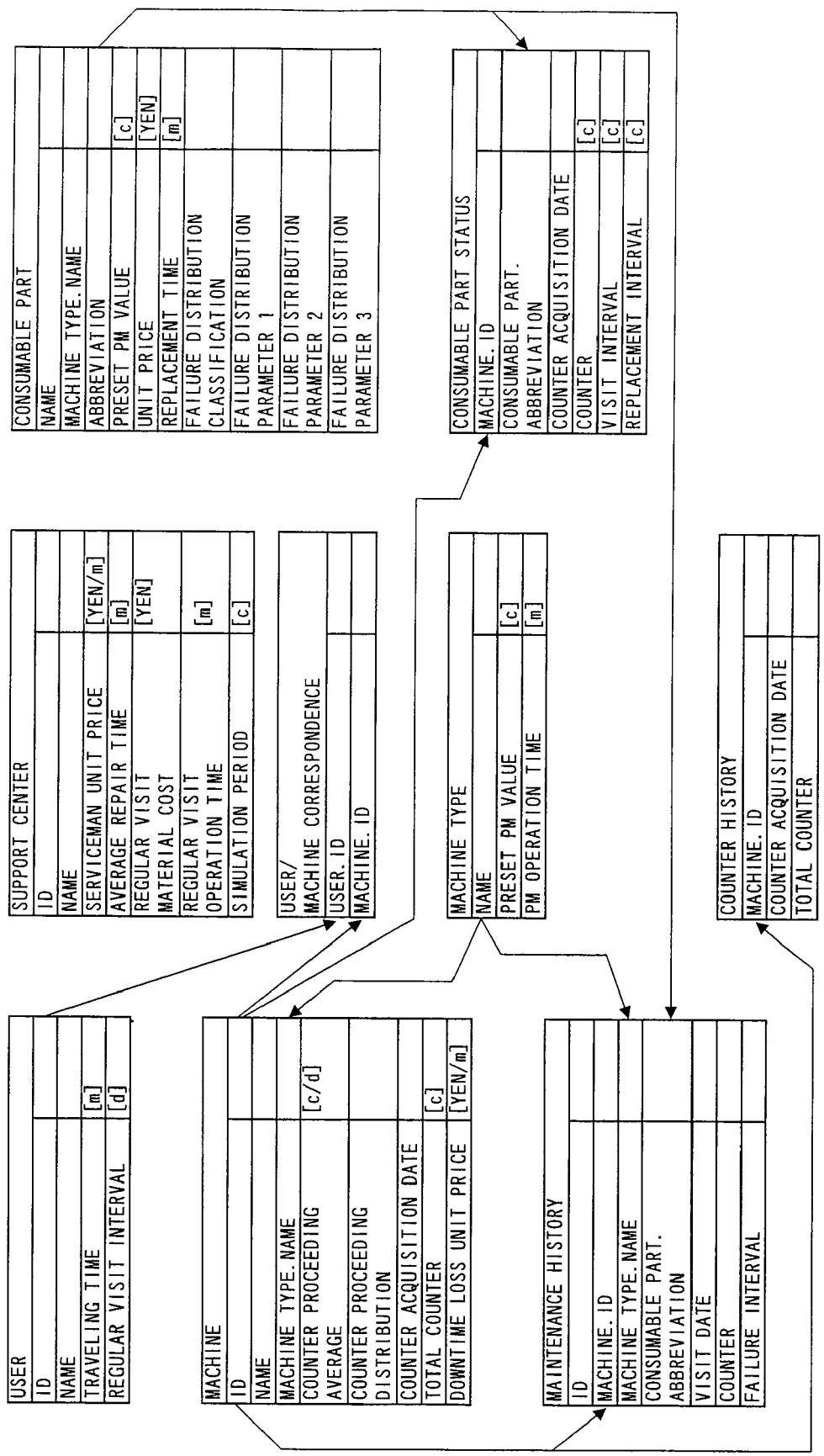
FIG. 2 is a view showing the relation between a data format and each data table used in the maintenance system 1 according to this embodiment.

FIG. 2 is a view showing the relation between a data format and each data table used in the maintenance system 1 according to this embodiment. As shown in FIG. 2, the maintenance system 1 uses nine data tables, that is, a "user" table in which a constant for each user is set, a "support center" table in which a constant for a support center is set, a "machine type" table in which a constant for a machine type is set, a "machine" table in which a constant for each machine and a variable calculated from the status of use are set, a "consumable part" table in which a constant for a consumable part and a failure rate variable calculated from market data are set, a "user/machine correspondence" table indicating the correspondence of a machine owned by a user, a "maintenance history" table in which maintenance operation history by a serviceman is recorded, a "consumable part status" table in which the status of each consumable part is set, and a "counter history" table in which counter history of each machine is recorded. The arrows in FIG. 2 indicate that the attribute of the start of the arrow is set into the attribute of the end of the arrow. The table name of the reference source is arranged before "." of the attribute of the end of the arrow, and the attribute name of the reference source is shown after "." For example, "machine. ID" in the "maintenance history" table indicates "ID" of the "machine" table.

The serviceman 202 follows the format of the maintenance history table on the basis of the operation record gathered as a maintenance operation report, and updates the maintenance history table in the storage unit 205, for example, by using an operation input unit, not shown, provided at the service center 203.

The MFP 201 is connected with the service center 203 so that they can communicate with each other via the Internet, public telephone line or the like. When a regular communication time (for example, 10 o'clock every day) set in the MFP 201 comes, the MFP 201 carries out communication with the service center 203. In this communication, the MFP 201 sends the ID number of the MFP 201, the current date and time, and the current total counter value to the service center 203. The service center 203 reflects the information received from the MFP 201 to the counter history table (FIG. 2) stored in the storage unit 205. After that, the MFP 201 confirms the status of communication and additional information, and ends the communication with the service center 203. FIG. 3 is a view showing an exemplary maintenance history table 301 with its contents updated as described above. The "total counter value" is a counter value indicating how many sheets are outputted as of A4 size, where 1 represents copying/printing in A4 and 2 represents copying/printing in A3. Here, the "counter" in the "maintenance history" table inputted by the serviceman 202 takes a similar value.

The failure rate distribution calculating unit 204 performs fitting to Weibull distribution (where m represents shape parameter and η represents scale parameter), which is broadly used for failure distribution analysis, $$F(t)=1-e\{-(t/\eta)^\wedge m\}$$

on the basis of the maintenance history table 301, thus estimating failure rate distribution of each consumable part.

In the following description, a "photoconductive drum", which is a consumable part of machine type A (FIG. 3), will be used. In order to find failure rate distribution of the photoconductive drum, the failure rate distribution calculating unit 204 extracts data related to the photoconductive drum from the maintenance history table 301 read from the storage unit 205 and calculates the failure interval. That is, all the tuples having "machine type.name" of "machine type A" and "consumable part.abbreviation" of "photoconductive drum", and all the tuples having "machine type.name" of "machine type A" and "consumable part.abbreviation" of "PM all-replacement" are extracted, and the failure interval is calculated from the difference from the counter value in the previous replacement.

The "end of life" column at the right end in the maintenance history table 301 is added for this description. An entry having "x" in the end of life column is data acquired when failure occurs before the photoconductive drum reaches PM, and an entry having "O" in the end of life column is data acquired when replacement is done because PM is reached without failure. The data thus acquired when replacement is made before failure (entry having "O") is referred to as "abort data". As an analysis method for such data, a cumulative hazard method is known. By the cumulative hazard method, the shape parameter m and the scale parameter η of Weibull distribution are estimated on the basis of the failure interval of each extracted tuple, and a failure distribution-related variable in the "consumable part" table is updated. That is, tuples in which "machine type.name" and "abbreviation" in the consumable part table coincide with "machine type A" and "photoconductive drum" are extracted. "Failure distribution parameter 1" is substituted into the shape parameter m and "failure distribution parameter 2" is substituted into the scale parameter η. In the "failure distribution classification" section, a constant (0) corresponding to Weibull distribution is set. This calculation is used for each consumable part and the consumable part table in the storage unit 205 is sequentially updated. FIG. 4 is a view showing an exemplary consumable part table 302 that is updated as described above.

The failure rate distribution calculating unit 204 also calculates proceeding distribution of the number of copied sheets per day for each apparatus that is a maintenance target, on the basis of the counter history table (FIG. 2). That is, tuples having the same "machine.ID" are extracted from the counter history table, and an average value and distribution of counter proceeding are calculated on the basis of the difference in the counter acquisition date (number of days) and the quantity of change in the counter (proceeding). Thus, "counter proceeding average" and "counter proceeding distribution" in the machine table (FIG. 2) are updated. Similarly, the up-to-date status of use and the replacement date of each consumable part are updated for each machine. FIG. 5 is a view showing an exemplary machine table 303 with its contents updated.

As for the status of use, from all the tuples extracted by "machine.ID" from the "counter history" table, the "counter acquisition date" and the "total counter" value at the time in the up-to-date "counter history" table are set into "counter acquisition date" and "total counter" in the machine table as the up-to-date counter data. The machine table 303 shown in FIG. 5 shows an example of updated data. For the replacement date for each consumable part, tuples having "consumable part.abbreviation" of the consumable part in question or tuples having "PM all-replacement" and "setup" are extracted from all the tuples extracted by "machine.ID" from the "maintenance history" table, and the up-to-date "visit date" is set into "counter acquisition date" in the "consumable part status" table (FIG. 2).

In the "counter" section in the "consumable part status" table, 0 is set. FIG. 6 is a view showing an example of data of a consumable part status table 304 with its contents updated as described above.

Next, the maintenance planning unit 206 will be described. The maintenance planning unit 206 is capable of executing a "strategy planning mode" and a "visit date presentation mode". The "strategy planning mode" is executed when a given quantity of maintenance history data is additionally registered to the storage unit 205 or at periodic timing such as once a month. The "visit date presentation mode" is executed every day.

First, the "strategy planning mode" will be described.

The maintenance planning unit 206 calculates and sets a "visit interval" and a "replacement interval" for each consumable part of each machine. The serviceman 202 is to carry out maintenance operations based on these "visit interval" and "replacement interval". That is, if at least one of a consumable part of a specific machine that is a maintenance target (here, the image processing apparatus 201) has reached the "visit interval", the serviceman 202 makes a visit to the apparatus. Then, the serviceman 202 replaces all the consumable parts that have reached the "replacement interval" at the time of this visit.

Next, the method for calculating a "visit interval" and a "replacement interval" will be described in detail. The maintenance planning unit 206 conducts a maintenance operation simulation of a period set as a "simulation period" in the "support center" table (see FIG. 2) and calculates a "visit interval" and a "replacement interval" that minimize the required cost. As the calculation method, a heuristic method, for example, the Monte Carlo method or genetic algorithm, is used, and a maintenance operation simulation is repeated with randomly set "visit interval" and "replacement interval", thus calculating the cost. Of these, the visit interval and the replacement interval that minimize the cost is employed.

A larger preset value of the simulation period is better, but the calculation time becomes longer accordingly. Therefore, it is desired that a period considered to be sufficient relatively to the average failure time of the machine is set. The cost in this case refers to the sum of the labor costs required for repair by the serviceman, the material costs of replaced consumable parts, and the loss (downtime loss) caused by the unavailability of the machine to the user due to unexpected machine failure.

Specifically, an exemplary simulation using the Monte Carlo method will be described. FIG. 7 shows samples of setting maintenance planning strategies (combinations of visit intervals and replacement intervals for each consumable part) with respect to a machine having "machine.ID" of "100213". Two thousand patterns of maintenance planning strategy samples are randomly created.

In the creation of the samples, basically, the samples are randomly generated. However, in order to prevent creation of unwanted samples, it is desired that samples are generated closely to visit intervals and replacement intervals that are expected from experience based on the failure probability distribution or the like of each consumable part. The maintenance operation simulation is conducted with these 2000 patterns of maintenance planning strategies, and the sample that minimizes the cost is found.

Figure 8:
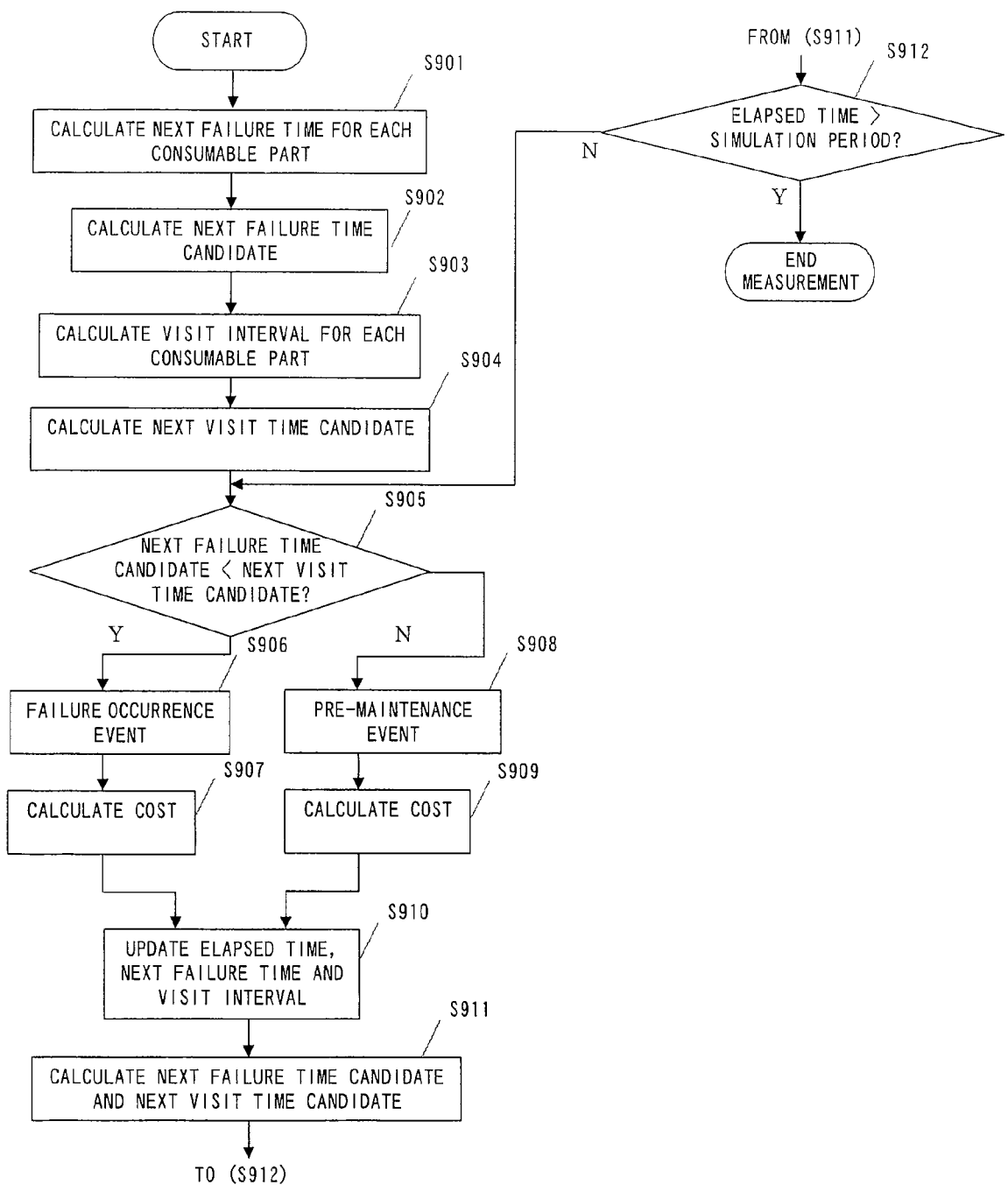
FIG. 8 is a flowchart showing a flow of maintenance operation simulation according to the maintenance system 1.

Next, the maintenance operation simulation with the maintenance planning strategy sample 1 (see FIG. 7) will be described. FIG. 8 is a flowchart showing the flow of the maintenance operation simulation by the maintenance system 1.

The maintenance planning unit 206 collates "machine type.name" in the "machine" table with "machine type.name" in the "consumable part" table with respect to "machine.ID" of 100213 and extracts all the matching tuples in the "consumable part" table. Random numbers are generated on the basis of the failure probability represented by "failure distribution classification", "failure distribution parameter 1" and "failure distribution parameter 2" in the "consumable part" table, and the next failure time of each consumable part is calculated (S901). The shortest one of the calculated next failure times is set as a next failure occurrence time candidate (S902). Meanwhile, "ID" in the "machine" table is collated with "machine.ID" in the "consumable part status" table, and all the matching tuples in the "consumable part status" table are extracted, thus calculating the next visit schedule of the serviceman. That is, with respect to each extracted consumable part status, the "visit interval" set in the sample 1 of FIG. 7 is referred to (S903), and the shortest time is set as a next visit time candidate (S904). Next, the calculated next failure occurrence time candidate is compared with the next visit time candidate, thus deciding an event (S905).

If the next failure time candidate is shorter than the next visit time candidate (Y in S905), the next failure time candidate is adopted as an elapsed time for a failure occurrence event (S906). The consumable part to be replaced is decided and the required cost is calculated. With respect to all the consumable parts except for the consumable part having occurrence of failure, the preset "replacement interval" in the "consumable part status" table is referred to, and the consumable part having a replacement interval shorter than the next failure replacement time candidate is decided as the consumable part to be replaced. The cost is the sum of the following costs (S907).

Labor costs=("user.traveling time"+Σ"consumable part.replacement time" of consumable part to be replaced)×serviceman unit price Material costs=Σ"consumable part.unit price" of consumable part to be replaced Downtime loss="user.traveling time"×"machine.downtime loss unit price"

Here, "user.traveling time" represents the traveling time from the support center to the user's location.

If the next failure time candidate is equal to or longer than the next visit time candidate (N in S905), the next visit time candidate is adopted as an elapsed time for a pre-maintenance event (S908). The consumable part to be replaced is decided and the required cost is calculated. With respect to all the consumable parts except for the consumable part for which pre-maintenance is to be performed (the visit interval is reached), the preset "replacement interval" in the "consumable part status" table is referred to, and the consumable part having a replacement interval shorter than the next visit time candidate is decided as the consumable part to be replaced. The cost is the sum of the following costs (S909).

Labor costs=("user.traveling time"+Σ"consumable part.replacement time" of consumable part to be replaced)×serviceman unit price Material costs=Σ"consumable part.unit price" of consumable part to be replaced Downtime loss=0

The idea of downtime is that the serviceman's operation time itself causes zero downtime because it is applied when the user is not using the machine in accordance with an agreement with the user. Here, the time until the serviceman comes in the case of unexpected failure is considered to be downtime.

When generating an event, a new next failure time is calculated for the replaced consumable part, and for the consumable part that has not been replaced, the elapsed time is subtracted from each of the calculated next failure time and the visit interval, thus updating the next failure time and the visit interval (S910). Then, similarly, the decision of a next failure time candidate and a next visit time candidate (S911), the decision of an event, the decision of a consumable part to be replaced, and the calculation of the cost are repeated until the elapsed time is reached during the simulation period (N in S912).

This simulation is considered to one set, and the simulation is conducted with respect to all the samples shown in FIG. 7. The sample that minimizes the calculated cost is employed and set in "consumable part status.visit interval" and "consumable part status.replacement interval" as the optimum strategy. FIG. 9 is a view showing the result of the simulation with respect to each sample. In this example, the 112th sample has the minimum cost per count and is thus employed as the optimum strategy.

Figure 10:
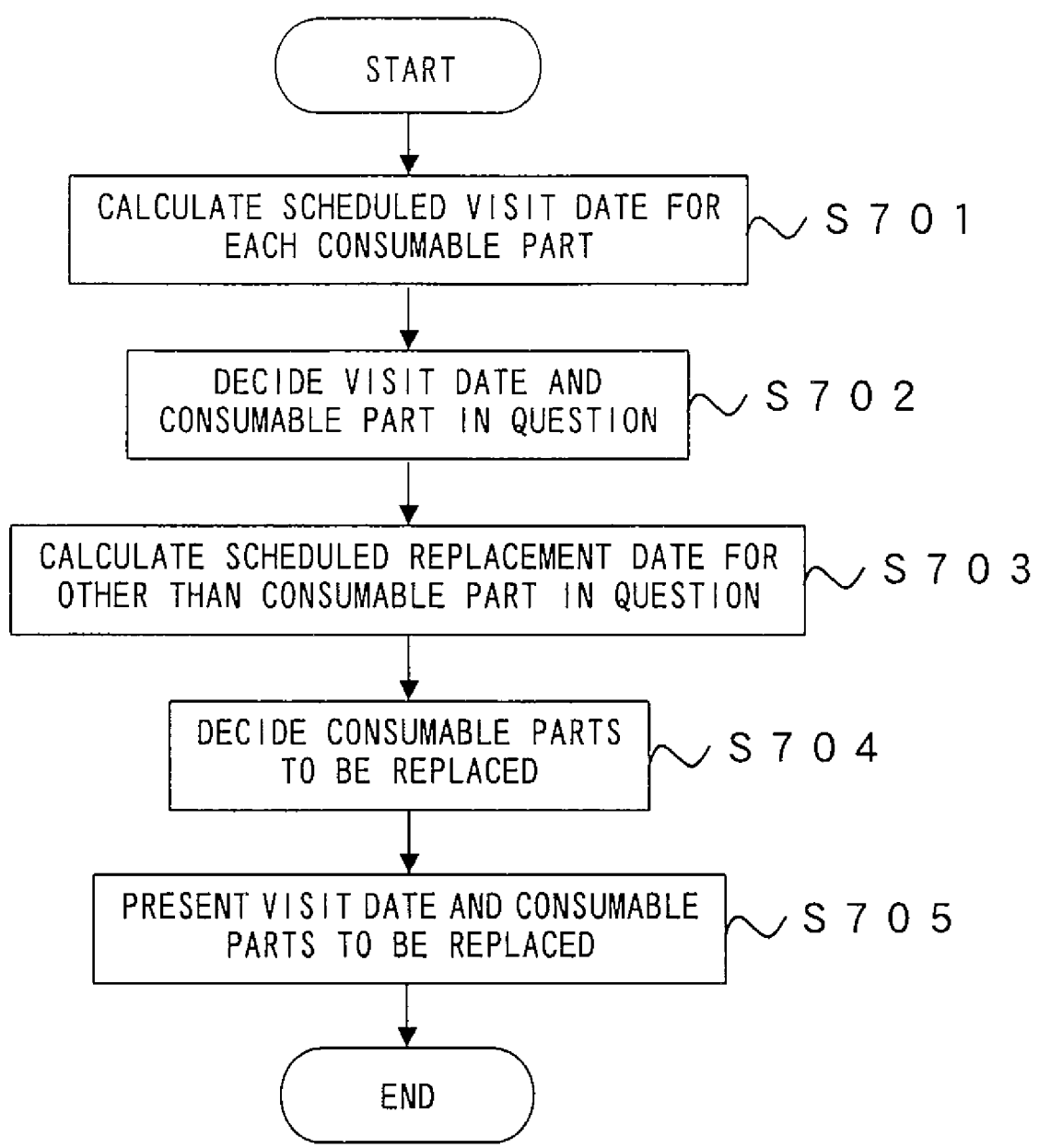
FIG. 10 is a flowchart showing a flow of processing in a visit date presentation mode in the maintenance system 1.

Next, the "visit date presentation mode" will be described. FIG. 10 is a flowchart showing the flow of processing in the visit date presentation mode in the maintenance system 1. FIG. 11 is a view showing an exemplary "counter history" table.

In the "visit date presentation mode", a case where the serviceman 202 constantly confirms the next visit date (visit timing for the apparatus) is considered. A desired "visit interval" and "replacement interval" are set in advance by the above-described "strategy planning mode", and the serviceman 202 inputs "machine.ID" of the machine which the serviceman takes charge of, by the operation input unit, not shown, at the service center, thereby confirming the next visit date.

The maintenance planning unit 206 collates "ID" in the "machine" table (see FIG. 2) with "machine.ID" in the "consumable part status" table (see FIG. 2), extracts all the matching tuples in the "consumable part status" table (see FIG. 2), and refers to "counter acquisition date", "counter", "visit interval" and "replacement interval". Also, it refers to "counter proceeding average" from the "machine" table. The maintenance planning unit 206 finds out the next scheduled visit date for each consumable part by the following calculation (S701).

Scheduled visit date=counter acquisition date+(visit interval−counter)/counter processing average Of the scheduled visit dates for the respective consumable parts, the nearest one is decided as the visit date (S702). Next, with respect to the consumable parts having the other schedule visit dates than the nearest one, the following calculation is performed to find out the scheduled replacement date (S703).

Scheduled replacement date=counter acquisition date+(replacement interval−counter)counter proceeding average The consumable part having a scheduled replacement date that is nearer than the visit date is decided as the consumable part to be replaced (S704) and is presented together with the visit date by the notifying unit 208 (S705). FIG. 12 shows exemplary output results.

Other than the above-described processing, "counter proceeding distribution" in the "machine" table (see FIG. 2) can be utilized to estimate the visit date by period.

Second Embodiment

Next, a second embodiment of this invention will be described.

This embodiment is a modification of the above-described first embodiment and the basic system configuration is the same. Hereinafter, the same parts as those described already in the first embodiment are denoted by the same numerals and will not be described further in detail.

In this embodiment, the MFP 201 as an apparatus that is a maintenance target has a cartridge in which a photoconductive unit, a charger, a cleaner, a developing unit and the like are integrally formed as a unit. The cartridge can be attachable to/removable from the main body.

In such a cartridge with various components integrated therein, replacement is necessary if one of the components constituting the cartridge is broken.

Therefore, in the "strategy planning mode", the "visit interval" and "replacement interval" set in the "consumable part status" table (see FIG. 2) are set to the same value with respect to all the components constituting the cartridge, and then set to minimize the calculated cost.

The cartridge can be easily attached and removed, the user can replace it (equivalent to a so-called customer replacement unit or CRU). In view of the cost and efficiency of the maintenance services, it is preferable that the replacement of such consumable parts that can be easily replaced is carried out on the user side, if possible.

Figure 13:
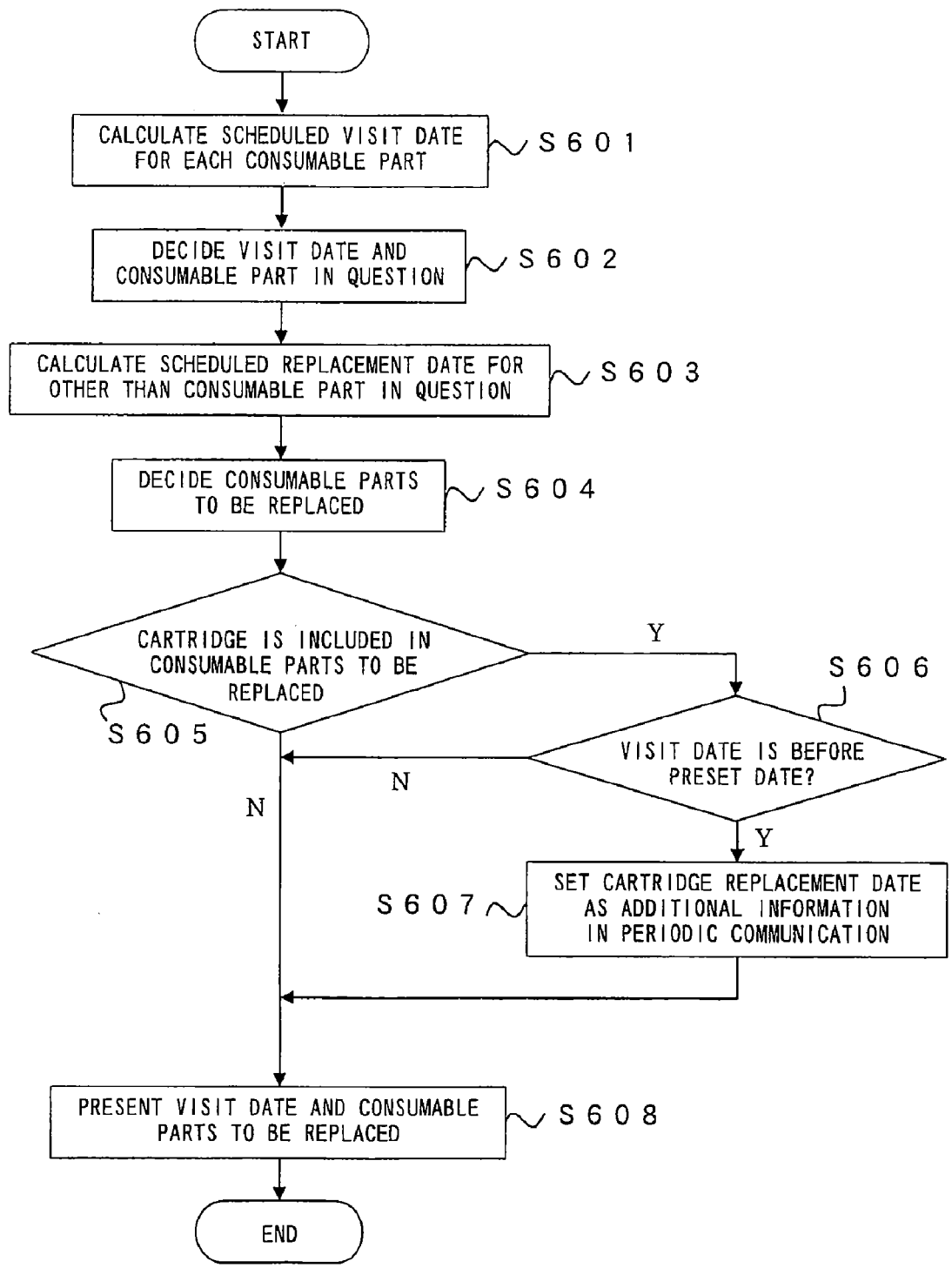
FIG. 13 is a flowchart showing a flow of processing in the "visit date presentation mode" in the maintenance system according to this embodiment.

FIG. 13 is a flowchart showing the flow of processing in the "visit date presentation mode" in the maintenance system according to this embodiment. The processing of S601 to S604 in the flowchart shown in FIG. 13 is similar to the processing of S701 to S704 shown in FIG. 10 in the first embodiment. Therefore, the processing of S605 and the subsequent steps will be described.

When the consumable part to be replaced on the visit date for the apparatus that is the maintenance target is decided by the maintenance planning unit 206 (S604), the replacement difficult judging unit 207 judges whether or not a component of the cartridge is included in the list of consumable parts to be replaced (S605). If a component of the cartridge is not included in the list of consumable parts to be replaced on the visit date (No in S605), the decided visit date and the list of consumable parts to be replaced on the visit date are presented by the notifying unit 208 (S608).

On the other hand, if a component of the cartridge is included in the list of consumable parts to be replaced on the visit date (Yes in S605), and if the decided visit date is before a preset date (Yes in S606), the visit date is set as "cartridge replacement date".

The replacement difficulty judging unit 207 registers the above-described "cartridge replacement date" to the storage unit 205. The MFP 201 downloads the information of the "cartridge replacement date" stored in the storage unit 205 as additional information at the time of regular communication, and displays a message of cartridge replacement on a control panel, not shown, provided in the MFP 201.

Thus, for consumable parts that can be replaced on the user side, the replacement operation is carried out on the user side without having the serviceman visit, and for consumable parts that are difficult to replace on the user side, the user can have the serviceman visit. Thus, improvement in the operation efficiency in the maintenance operation can be realized.

Figure 14:
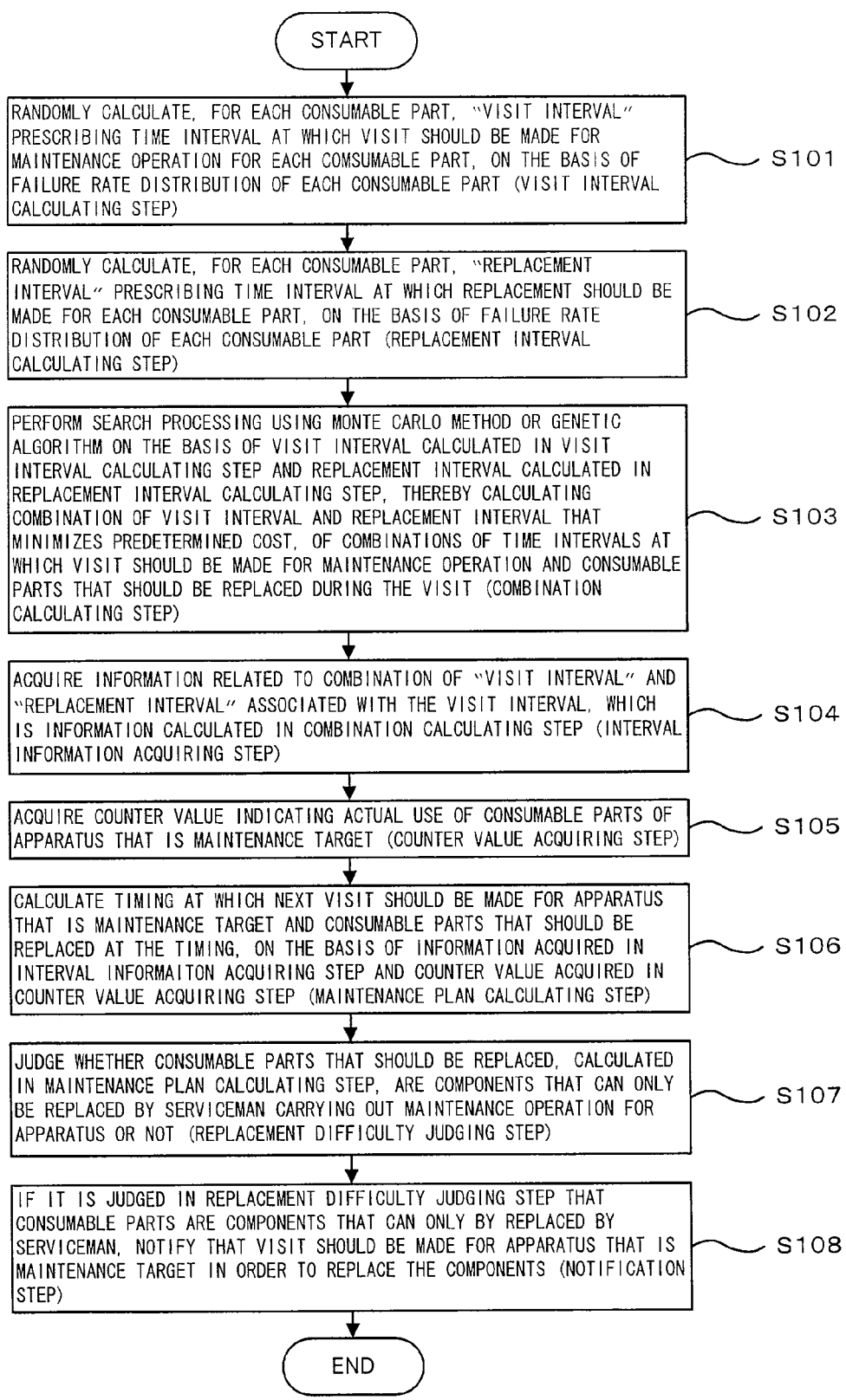
FIG. 14 is a flowchart for explaining a flow of processing (maintenance method) in the maintenance system according to this embodiment.

FIG. 14 is a flowchart for explaining a schematic flow of processing (maintenance method) in the maintenance system according to this embodiment.

The maintenance planning unit (visit interval calculating unit) 206 randomly calculates, for each consumable part, a "visit interval" prescribing a time interval at which a visit should be made for maintenance operation for each consumable part, on the basis of the failure rate distribution of each consumable part (visit interval calculating step) (S101).

The maintenance planning unit (replacement interval calculating unit) 206 randomly calculates, for each consumable part, a "replacement interval" prescribing a time interval at which replacement should be made for each consumable part, on the basis of the failure rate distribution of each consumable part (replacement interval calculating step) (S102).

In the visit interval calculating step and the replacement interval calculating step, a value close to an interval with which it is predicted that the failure probability is equal to or higher than a predetermined probability, on the basis of the failure probability distribution of each consumable part. The visit interval calculated for each consumable part in the visit interval calculating step is set to be longer than the replacement interval calculated by the replacement interval calculating step.

Next, the maintenance planning unit (combination calculating unit) 206 performs search processing using the Monte Carlo method or genetic algorithm on the basis of the "visit interval" calculated in the visit interval calculating step and the "replacement interval" calculated in the replacement interval calculating step, thereby calculating a combination of a visit interval and a replacement interval that minimizes a predetermined cost, of combinations of time intervals at which a visit should be made for maintenance operation and consumable parts that should be replaced during the visit (combination calculating step) (S103).

The "predetermined cost" described here is the sum of the labor costs required for the maintenance operation by the serviceman, the material costs of the consumable parts, and the amount of loss caused by the unavailability of the apparatus that is the maintenance target to the user.

Then, the maintenance planning unit (interval information acquiring unit) 206 acquires information related to a combination of the "visit interval" and the "replacement interval" associated with the visit interval, which is the information calculated in the combination calculating step (interval information acquiring step) (S104).

The counter value acquiring unit 209 acquires a counter value indicating actual use of the consumable parts of the apparatus that is the maintenance target (counter value acquiring step) (S105).

The maintenance planning unit (maintenance plan calculating unit) 206 calculates "timing at which the next visit should be made for the apparatus that is the maintenance target" and a "list of consumable parts that should be replaced at the timing", on the basis of the information acquired in the interval information acquiring step and the counter value acquired in the counter value acquiring step (maintenance plan calculating step) (S106).

The replacement difficulty judging unit 207 judges whether the consumable parts that should be replaced, calculated in the maintenance plan calculating step, are components that can only be replaced by the serviceman carrying out the maintenance operation for the apparatus (SRU) or not (replacement difficult judging step) (S107).

If it is judged in the replacement difficulty judging step that the consumable parts are components that can only be replaced by the serviceman, the notifying unit 208 issues a notification that a visit should be made for the apparatus that is the maintenance target in order to replace the components (notification step) (S108).

In this description, the example where the visit interval calculating step is executed prior to the replacement interval calculating step is described. However, the order is not limited to this as long as both of these processing steps are completed before the execution of the combination calculating step. In this description, the example where the visit interval calculating step to the sense information acquiring step are executed prior to the counter value acquiring step is described. However, it suffices that the processing of the counter value acquiring step and the interval information acquiring step is completed before the execution of the maintenance plan calculating step.

Each step in the above-described processing in the maintenance system 1 is realized by causing the CPU 801 to execute a maintenance planning program stored in the memory 802.

In this embodiment, the case where the function to carry out the invention has been recorded in advance within the apparatus is described. However, other than this, the similar function may be downloaded to the apparatus from a network, or the similar function stored in a recording medium may be installed into the apparatus. As a recording medium, any form of recording medium that can store a program and that is readable by the apparatus, such as a CD-ROM, may be used. Also, the function acquired in advance by installing or downloading may be realized in cooperation with the OS (operating system) or the like in the apparatus.

As described above, according to this embodiment, by setting the two judgment references of "visit interval" and "replacement interval" for individual consumable parts, the serviceman can grasp "when to visit" and "which consumable parts should be replaced". Also, since a desired visit interval and replacement interval (strategy) is calculated in advance and the next visit date is usually calculated on the basis of the decided strategy, the cost required for the calculation can be reduced. Moreover, since the status of use of the apparatus that is a maintenance target can be gathered in real time, the certainty of prediction of a visit date for the apparatus is significantly improved.

This invention has been described in detail by using the specific modes. However, it is obvious to those skilled in the art that various changes and modifications can be made without departing from the spirit and scope of this invention.

According to this invention, as described above in detail, a technique can be provided that enables reduction in the cost related to the maintenance services and that also enables reduction the downtime of the product.

What is claimed is:

1. A maintenance system adapted for making a maintenance plan for consumable parts of an apparatus that is a maintenance target, comprising:
    an interval information acquiring unit configured to acquire information related to a combination of a visit interval that prescribes a time interval at which a visit should be made for maintenance operation for each consumable part, and a replacement interval, associated with the visit interval, that prescribes a time interval at which each consumable part should be replaced;
    a counter value acquiring unit configured to acquire a counter value that indicates actual use of consumable parts in the apparatus; and
    a maintenance plan calculating unit configured to calculate timing at which a next visit should be made for the apparatus, and a consumable part that should be replaced at the timing, on the basis of the information acquired by the interval information acquiring unit and the counter value acquired by the counter value acquiring unit.

2. The maintenance system according to claim 1, wherein the consumable parts include a cartridge in which plural consumable parts having different functions from each other are formed integrally as a unit.

3. The maintenance system according to claim 1, comprising:
    a replacement difficulty judging unit configured to judge whether or not the consumable part that should be replaced, calculated by the maintenance plan calculating unit, is a component that can only be replaced by a serviceman carrying out maintenance operation for the apparatus; and
    a notifying unit configured to, if the replacement difficulty judging unit judges that the consumable part is a component that can only be replaced by the serviceman, issue a notification that a visit should be made for the apparatus in order to replace the component.

4. The maintenance system according to claim 1, comprising:
    a visit interval calculating unit configured to calculate the visit interval for each consumable part on the basis of failure rate distribution of each consumable part;
    a replacement interval calculating unit configured to calculate the replacement interval for each consumable part on the basis of failure rate distribution of each consumable part; and
    a combination calculating unit configured to calculate information related to a combination of a time interval at which a visit should be made for maintenance operation and a consumable part that should be replaced at the timing, on the basis of the visit interval calculated by the visit interval calculating unit and the replacement interval calculated by the replacement interval calculating unit;
    wherein the interval information acquiring unit acquires the information calculated by the combination calculating unit.

5. The maintenance system according to claim 4, wherein the visit interval calculating unit randomly calculates the visit interval, and the replacement interval calculating unit randomly calculates the replacement interval, and
    the combination calculating unit finds a combination of a visit interval and a replacement interval that minimizes a predetermined cost, on the basis of the visit interval calculated by the visit interval calculating unit and the replacement interval calculated by the replacement interval calculating unit.

6. The maintenance system according to claim 5, wherein the visit interval calculated for each consumable part by the visit interval calculating unit is set to be longer than the replacement interval calculated by the replacement interval calculating unit.

7. The maintenance system according to claim 5, wherein the predetermined cost is a sum of labor cost required for maintenance operation by a serviceman, material cost of consumable parts, and amount of loss caused by unavailability of the apparatus that is the maintenance target to a user.

8. The maintenance system according to claim 5, wherein the combination calculating unit performs search processing using a Monte Carlo method or a genetic algorithm on the basis of the visit interval calculated by the visit interval calculating unit and the replacement interval calculated by the replacement interval calculating unit, thereby finding a combination of a visit interval and a replacement interval that minimizes the predetermined cost.

9. The maintenance system according to claim 5, wherein the visit interval calculating unit and the replacement interval calculating unit calculate, on the basis of failure probability distribution of each consumable part, a value close to an interval with which the failure probability is predicted to be equal to or higher than a predetermined probability.

10. A maintenance system for making a maintenance plan for consumable parts of an apparatus that is a maintenance target, comprising:
    interval information acquiring means for acquiring information related to a combination of a visit interval that prescribes a time interval at which a visit should be made for maintenance operation for each consumable part, and a replacement interval, associated with the visit interval, that prescribes a time interval at which each consumable parts should be replaced;
    counter value acquiring means for acquiring a counter value that indicates actual use of consumable parts in the apparatus; and
    maintenance plan calculating means for calculating timing at which a next visit should be made for the apparatus, and a consumable part that should be replaced at the timing, on the basis of the information acquired by the interval information acquiring means and the counter value acquired by the counter value acquiring means.

11. The maintenance system according to claim 10, comprising:
    replacement difficulty judging means for judging whether or not the consumable part that should be replaced, calculated by the maintenance plan calculating means, is a component that can only be replaced by a serviceman carrying out maintenance operation for the apparatus; and
    notifying means for, if the replacement difficulty judging means judges that the consumable part is a component that can only be replaced by the serviceman, issuing a notification that a visit should be made for the apparatus in order to replace the component.

12. A maintenance method adapted for making a maintenance plan for consumable parts of an apparatus that is a maintenance target, comprising:
    acquiring information related to a combination of a visit interval that prescribes a time interval at which a visit should be made for maintenance operation for each consumable part, and a replacement interval, associated with the visit interval, that prescribes a time interval at which each consumable parts should be replaced;

acquiring a counter value that indicates actual use of consumable parts in the apparatus; and calculating using a CPU, timing at which a next visit should be made for the apparatus, and a consumable part that should be replaced at the timing, on the basis of the acquired information related to the combination of the visit interval and the replacement interval, and the acquired counter value.

13. The maintenance method according to claim 12, wherein the consumable parts include a cartridge in which plural consumable parts having different functions from each other are formed integrally as a unit.

14. The maintenance method according to claim 12, comprising:

judging whether or not the consumable part that should be replaced is a component that can only be replaced by a serviceman carrying out maintenance operation for the apparatus; and if the consumable part is judged to be a component that can only be replaced by the serviceman, issuing a notification that a visit should be made for the apparatus in order to replace the component.

15. The maintenance method according to claim 12, comprising:

calculating the visit interval for each consumable part on the basis of failure rate distribution of each consumable part;

calculating the replacement interval for each consumable part on the basis of failure rate distribution of each consumable part; and calculating the information related to the combination of the time interval and the replacement interval, on the basis of the visit interval as calculated and the replacement interval as calculated.

16. The maintenance method according to claim 15, wherein the visit interval is randomly calculated, and the replacement interval is randomly calculated, and the combination of the visit interval and the replacement interval that minimizes a predetermined cost is found, on the basis of the visit interval as calculated and the replacement interval as calculated.

17. The maintenance method according to claim 16, wherein the visit interval calculated for each consumable part is set to be longer than the replacement interval.

18. The maintenance method according to claim 16, wherein the predetermined cost is a sum of labor cost required for maintenance operation by a serviceman, material cost of consumable parts, and amount of loss caused by unavailability of the apparatus that is the maintenance target to a user.

19. The maintenance method according to claim 16, wherein the combination of the visit interval and the replacement interval that minimizes the predetermined cost is found using a Monte Carlo method or a genetic algorithm on the basis of the visit interval as calculated and the replacement interval as calculated.

20. The maintenance method according to claim 16, wherein the visit interval and the replacement interval are each calculated on the basis of failure probability distribution of each consumable part and to have a value close to an interval with which the failure probability is predicted to be equal to or higher than a predetermined probability.

* * * * *